United States Patent [19]
Moretti et al.

[11] Patent Number: 6,147,930
[45] Date of Patent: Nov. 14, 2000

[54] OPTICAL HYDROPHONE WITH DIGITAL SIGNAL DEMODULATION

[75] Inventors: David J. Moretti, Wakefield, R.I.; Michael Amaral, Westport, Mass.; Antonio L. Deus, III, Saunderstown, R.I.; Gerald L. Assard, Waterford, Conn.

[73] Assignee: The United States of America as represented by the Secretary of the Navy, Washington, D.C.

[21] Appl. No.: 09/360,718

[22] Filed: Feb. 2, 1999

[51] Int. Cl.[7] .................................................. G01B 9/02
[52] U.S. Cl. .............................................. 367/149; 367/131
[58] Field of Search ..................................... 367/149, 131; 356/345, 346, 350; 250/227.19, 227.27; 329/306, 307, 304, 308; 375/324, 340

[56] References Cited

U.S. PATENT DOCUMENTS

| | | | |
|---|---|---|---|
| 4,947,408 | 8/1990 | Sadr et al. | 375/94 |
| 5,051,965 | 9/1991 | Poorman | 367/149 |
| 5,155,707 | 10/1992 | Fisher | 367/149 |
| 5,903,350 | 5/1999 | Bush et al. | 356/345 |

*Primary Examiner*—Ian J. Lobo
*Attorney, Agent, or Firm*—Michael J. McGowan; Prithvi C. Lall; Michael F. Oglo

[57] ABSTRACT

A system for digitally demodulating optical hydrophone signals is provided. The system includes an optical hydrophone connected to an analog-to-digital converter and further connected to a digital signal processor. Within the digital signal processor, a basic demodulator has a first and second mixing tables, the first table operating at a modulating frequency, $\omega$, injected into reference legs of the hydrophone, and a second table operating at $2\omega$. The mixer frequencies are coherently mixed with the incoming acoustic signals received by the hydrophone. An automatic calibration circuit which adjusts the phase of the mixers is connected to the basic demodulator.

11 Claims, 3 Drawing Sheets

OPTICAL HYDROPHONE WITH DIGITAL SIGNAL DEMODULATION

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The invention described herein relates to hydrophone signal processing and in particular to digital demodulation for optical hydrophones.

(2) Description of the Prior Art

A typical optical hydrophone has a reference leg and a sensing leg. The sensing leg is formed by wrapping a fiber optic cable around a compliant mandrel. The reference leg is formed by wrapping a length of fiber optic cable around a noncompliant mandrel. During operation, light is pulsed down both fiber legs and reflected by mirrors imbedded in the ends of the fibers. The output of both legs, the reference and sensing legs, are summed at a node forming an interferometer. This summation produces a phase modulating signal of the form $$O = A + B\cos\theta(t) \quad (1)$$

where

A & B = Constants proportional to the input power, and $\theta(t)$ = Phase difference between the interferometer sensor and reference leg.

Typically, a sinusoidal modulating frequency is injected through a piezoelectric element on the reference leg of the interferometer. The output signal is given by $$O = A + B\cos(C\cos\omega_0(t) + x(t)) \quad (2)$$

where $x(t)$ = Signal of interest,

C = Modulating signal amplitude, and $\omega_0$ = Modulating signal frequency.

Typically, analog demodulators are used to process the output signal. These demodulators are complex custom-built hardware, requiring both expensive and time-consuming operation during calibration. What is needed is a system for using programmable digital signal processor for demodulation and for calibration.

SUMMARY OF THE INVENTION

It is an object of the invention to provide a system for demodulation of hydrophone signals which can be implemented using a programmable digital signal processor.

It is another object of the invention to provide a system for demodulation of hydrophone signals having an included calibration means.

It is yet another object of the invention to provide a system for demodulation of hydrophone signals having a means of automatic gain adjustment.

Accordingly, the invention is a system for digitally demodulating optical hydrophone signals comprising an optical acoustic sensor assembly connected to an analog-to-digital converter, which is, in turn, connected to a digital signal processor. The received acoustic signal produces an optical signal having an output from an interferometer according to known processes. The output of the interferometer is converted from an optical signal and sampled at a high rate by the analog-to-digital converter. The data produced by the sampling is stored in two mixer tables, the first table having a modulating frequency, $\omega$, and the second table having a modulating frequency $2\omega$. The signal is filtered and decimated (by decimation factor, d) using a Martinez and ParksT™ low-pass filter. The output is then normalized and each leg is differentiated using a one-pole, low-pass filter. The output of the one-pole, low-pass, filter is then cross-multiplied and combined. A further high-pass filter produces the signal of interest, $x(t)$. In order for the system to operate, it is necessary to maintain mixer frequencies coherent with the incoming waveform. This coherence is obtained by a calibration module, which automatically corrects the two mixer table values to maintain approximately zero output from the calibration module.

BRIEF DESCRIPTION OF THE DRAWINGS

The foregoing objects and other advantages of the present invention will be more fully understood from the following detailed description and reference to the appended drawings wherein.

DESCRIPTION OF THE PREFERRED EMBODIMENTS

Figure 1:
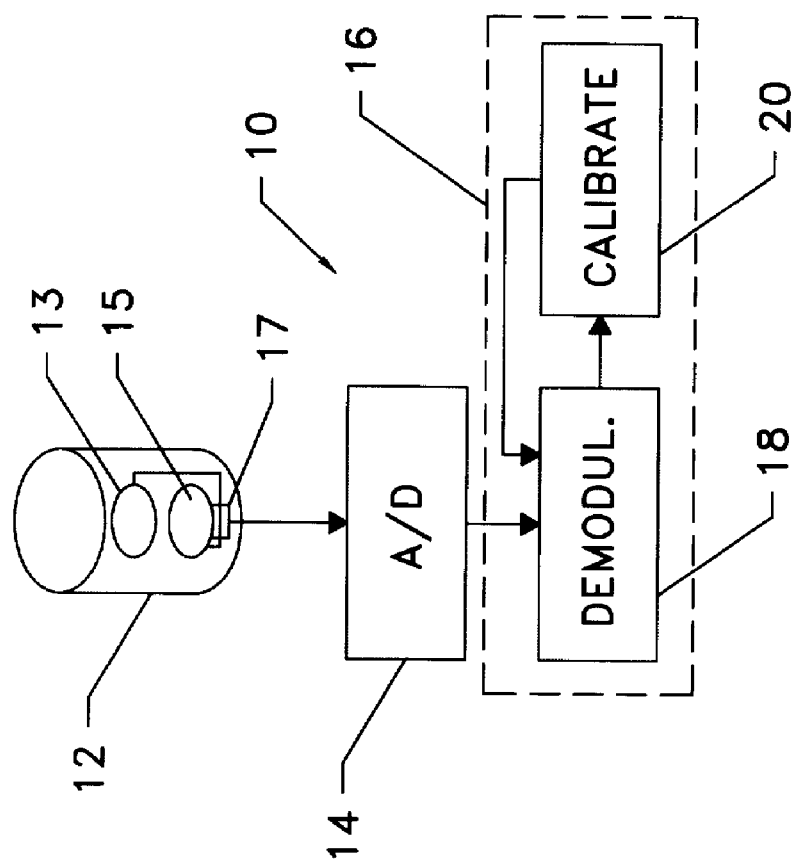
FIG. 1 is a block diagram showing the major components of the digital demodulation system.
Figure 2:
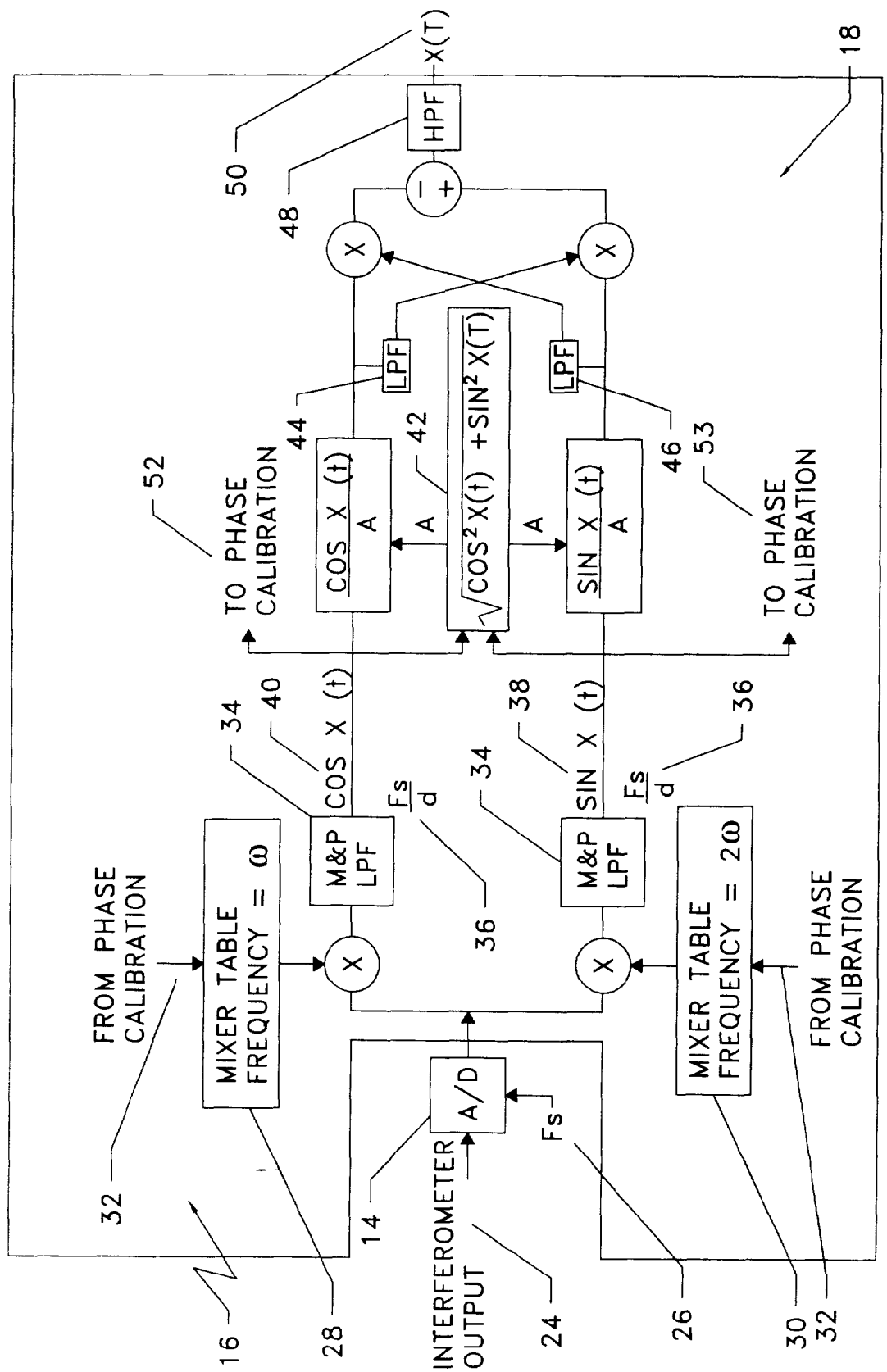
FIG. 2 is a schematic showing the process of the demodulation.

Referring now to FIG. 1, the system for digital signal demodulation, designated generally by the reference numeral 10, is shown with its major components. The system 10 comprises an optical hydrophone 12 having a first optical leg 13 comprising an optical cable wound on a compliant mandrel; the first optical leg being the sensing leg, and a second optical leg 15 having an optical cable wound on a non-compliant mandrel, the second optical leg being the reference leg. The signals from the two legs are combined using an interferometer section 17, which is connected to an analog-to-digital (A/D) converter 14. The output of the A/D converter 14 is fed to a digital signal processor (DSP) 16. The DSP 16 incorporates two custom modules, the basic demodulator 18 and the automatic calibration module 20. These two modules control processing of acoustic signal and make up a processing module which may be implemented in software or hardware and which physically resides within the DSP 16. The operation of the basic demodulator 18 may be more fully seen in FIG. 2. An interferometer output 24 is converted to an electrical signal and sent to the A/D converter 14. The A/D converter 14 samples the converted data at a high rate storing approximately ten times the number of data points needed to process the incoming signals. The stored digitized data is mixed using two mixer tables, a first mixer table 28 having a mixing frequency, $\omega$, where $\omega$ is the modulating frequency injected in the reference leg of the interferometer, and a second mixer table 30 having a mixing frequency of $2\omega$. The signals at $\omega$ and $2\omega$ are in quadrature. The incoming signals from the A/D converter 14 must be coherently mixed with the mixer table frequencies, $\omega$ and $2\omega$. The coherent mixing is accomplished by phase calibration 32 as more fully described in FIG. 3. After mixing the signals are filtered through Martinez and Parks™ low-pass filters 34 and decimated 36 by decimation factor, d. As the sampling rate for providing a digital representation of the sine wave 38 and cosine wave 40 are oversampled by a factor of ten (ten times the needed number of data points are collected), decimation allows a division of the excess data points to provide the necessary number of points. Thereafter, the signal is normalized by the normalizer 42. Each it signal leg is then differentiated using a low-pass differentiator 44 and 46 and the results are cross-multiplied and combined. The output is then high pass filtered through high-pass integrator 48 yielding the signal of interest x(t) 50.

Figure 3:
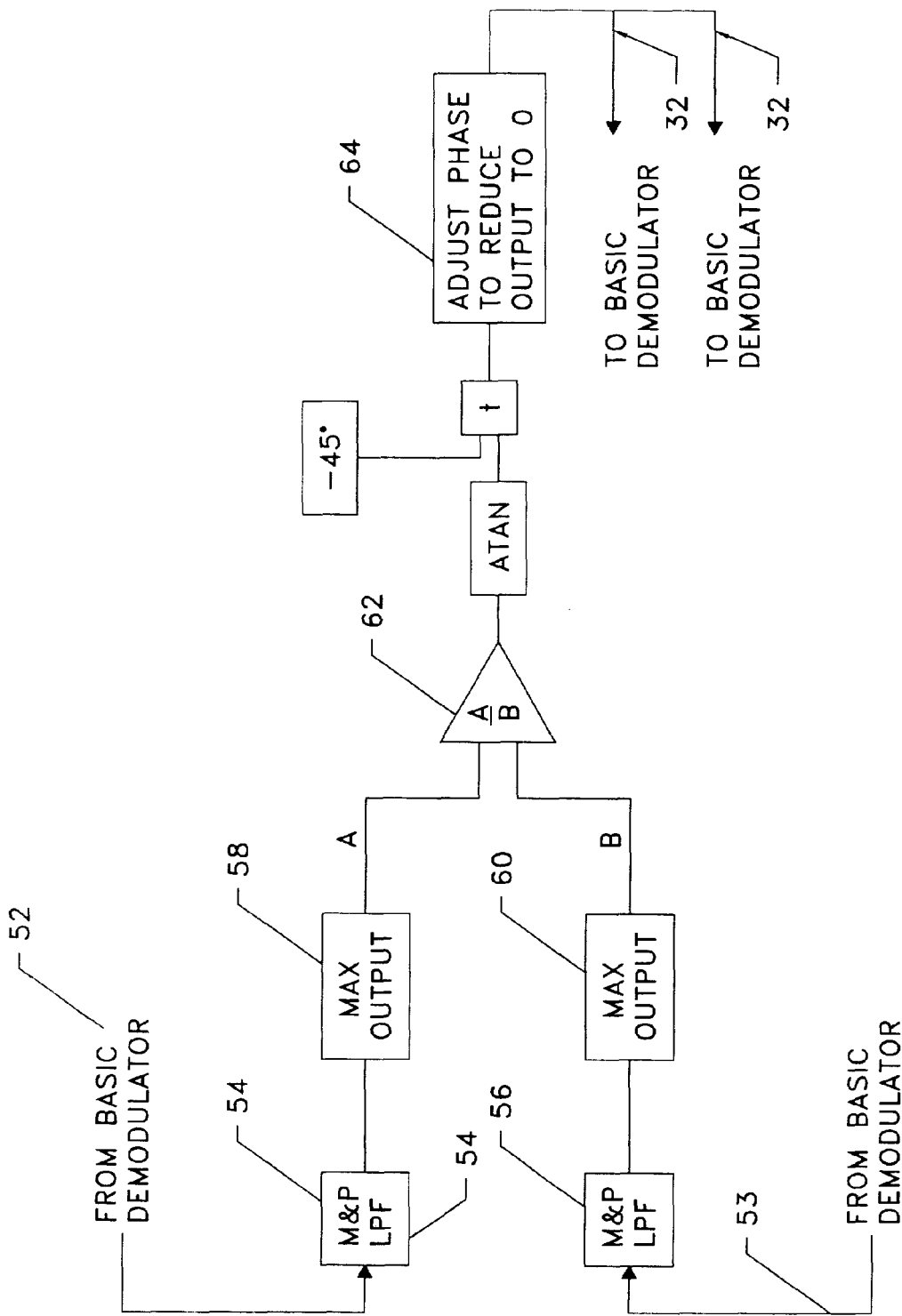
FIG. 3 is a schematic showing the calibration process for the demodulator.

As the system will operate only when the mixer frequencies are coherent with the incoming waveform, a calibration circuit, shown in FIG. 3, is used to provide coherence. The signals 52 and 53 received from the basic demodulator are processed using the Martinez and Parks™ low-pass filters, 54 and 56, respectively. Thereafter, the signal maximums are selected, represented by Max Output 58 and Max Output 60. The signals are then processed by the operational amplifier 62 receiving the first and second output maximums and an iteration to provide an inverse tangent output of zero, thereby causing coherent mixing of the received signals in the basic demodulator. When the output is not zero, feedback 32 to the basic demodulator continues and when the output reaches zero, no further phase adjustment occurs.

The features and advantages of the system are numerous. Using the demodulation system, standard commercial off-the-shelf digital signal processors can be used to demodulate the acoustic signal from an optical hydrophone. The system provides a built-in means of automatically calibrating the system, thereby maintaining the signal mixing coherence. In addition, the normalization function automatically adjusts the gain of the system as needed. It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An optical hydrophone system comprising:

an optical interferometer;

an analog-to-digital converter connected to said optical interferometer; and a digital signal processor connected to and receiving output signals from said analog-to-digital converter, said digital processor including a basic demodulator module located within said digital signal processor and a calibration module located within said digital signal processor and connected to said basic demodulator.

2. An optical hydrophone system as in claim 1 wherein said optical interferometer comprises a first optical leg having an optical cable wound on a compliant mandrel and a second optical leg, providing a reference, having an optical cable wound on a non-compliant mandrel.

3. An optical hydrophone system as in claim 2 wherein said optical interferometer further comprises an interferometer section.

4. An optical hydrophone system as in claim 1 wherein said basic demodulator comprises a plurality of mixer tables for storing modulating frequency data.

5. An optical hydrophone system as in claim 4 wherein said plurality of mixer tables comprise a first mixer table having a mixing frequency, $2\omega$, which is twice the frequency injected into the sensing leg of said interferometer, and a second mixer table having a mixing frequency, $\omega$, which is the frequency injected into the reference leg of said interferometer and wherein $\omega$ and $2\omega$ are also in quadrature.

6. An optical hydrophone system as in claim S wherein said basic demodulator further comprises a first low-pass filter receiving the output of said first mixer table and a second low-pass filter receiving the output of said second mixer table.

7. An optical hydrophone system as in claim 6 wherein said basic demodulator further comprises a normalizer which adjusts the gains of the low-pass filter outputs.

8. An optical hydrophone system as in claim 7 wherein said basic demodulator further comprises a first low-pass differentiator connected to the output of said first low-pass filter and a second low-pass differentiator connected to the output of said second low-pass filter.

9. An optical hydrophone system as in claim 8 wherein said basic demodulator further comprises a high-pass integrator receiving the summation of the first and second output signals after cross-multiplication.

10. An optical hydrophone system as in claim 9 wherein said calibration module comprises a first low-pass filter selecting an output maximum from a sine-wave signal received from said basic demodulator and a second low-pass filter selecting an output maximum from a cosine-wave signal received from said basic demodulator.

11. An optical hydrophone system as in claim 10 wherein said calibration module further comprises an operational amplifier receiving the first and second output maximums and an iteration to provide an inverse tangent output of zero, thereby causing coherent mixing of the received signals in the basic demodulator.

* * * * *